(12) United States Patent
Seibert

(10) Patent No.: US 11,174,979 B2
(45) Date of Patent: Nov. 16, 2021

(54) CONSOLE FOR AN OPERATING UNIT OF TECHNICAL INSTALLATIONS

(71) Applicant: BYSTRONIC LASER AG, Niederoenz (CH)

(72) Inventor: Friedemann Seibert, Winterbach/Pfalz (DE)

(73) Assignee: BYSTRONIC LASER AG, Niederoenz (CH)

( * ) Notice: Subject to any disclaimer, the term of this patent is extended or adjusted under 35 U.S.C. 154(b) by 0 days.

(21) Appl. No.: 17/259,289

(22) PCT Filed: Oct. 21, 2019

(86) PCT No.: PCT/EP2019/078508
§ 371 (c)(1),
(2) Date: Jan. 11, 2021

(87) PCT Pub. No.: WO2020/083810
PCT Pub. Date: Apr. 30, 2020

(65) Prior Publication Data
US 2021/0247017 A1 Aug. 12, 2021

(30) Foreign Application Priority Data

Oct. 22, 2018 (DE) .......................... 102018126175.6

(51) Int. Cl.
*F16M 11/10* (2006.01)
*F16M 11/24* (2006.01)
(Continued)

(52) U.S. Cl.
CPC ............. *F16M 11/10* (2013.01); *F16M 11/24* (2013.01); *A47B 2097/005* (2013.01);
(Continued)

(58) Field of Classification Search
CPC .... F16M 11/10; F16M 11/24; F16M 2200/08; A47B 97/005
See application file for complete search history.

(56) References Cited

U.S. PATENT DOCUMENTS 4,365,561 A * 12/1982 Tellier .................... A47B 11/00
108/142
7,901,001 B2 * 3/2011 Seitz .................... B23Q 1/0009
297/217.7
(Continued)

FOREIGN PATENT DOCUMENTS

GB  2401784 A  11/2004

OTHER PUBLICATIONS

European Patent Office, International Preliminary Report on Patentability for PCT/EP2019/078508 filed Oct. 21, 2019, dated Sep. 29, 2020.
(Continued)

*Primary Examiner* — Bradley Duckworth
(74) *Attorney, Agent, or Firm* — Workman Nydegger

(57) ABSTRACT

The invention relates to a console for an operating unit of technical installations, in particular workpiece processing machines, comprising a base element (14); a stand element (16) held on the base element, the stand element having a first segment (18) and a second segment (20), the first segment being provided on the base element (14), and the second segment being angled on the first segment and having a free end; and a mounting support (22) for the operating unit, wherein an adjusting device is provided for adjusting the mounting support on the second segment relative to the free end; wherein the second segment with the first segment forms an angle greater than 180°.

10 Claims, 7 Drawing Sheets

(51) Int. Cl.
*A47B 97/00* (2006.01)
*F16M 11/20* (2006.01)
*F16M 13/02* (2006.01)

(52) U.S. Cl.
CPC ......... *F16M 11/2014* (2013.01); *F16M 13/02* (2013.01); *F16M 2200/08* (2013.01)

(56) References Cited

U.S. PATENT DOCUMENTS

| | | | | |
|---|---|---|---|---|
| 8,393,585 | B2* | 3/2013 | Han | A47B 47/02 |
| | | | | 248/158 |
| 9,039,016 | B2* | 5/2015 | Abernethy | A47B 21/02 |
| | | | | 280/6.15 |
| 9,720,444 | B2* | 8/2017 | Holden | A47B 13/081 |
| 10,149,542 | B2* | 12/2018 | Diekroger | F16M 11/42 |
| 10,405,647 | B2* | 9/2019 | Laudadio | A47B 21/04 |
| 10,514,126 | B2* | 12/2019 | Asante | F16M 11/28 |
| 10,550,996 | B1* | 2/2020 | Chen | F16M 11/14 |
| 2004/0011932 | A1 | 1/2004 | Duff | |
| 2005/0230573 | A1* | 10/2005 | Ligertwood | F16M 11/42 |
| | | | | 248/158 |
| 2006/0171105 | A1* | 8/2006 | Hsiao | F16M 11/18 |
| | | | | 361/679.06 |
| 2007/0145203 | A1* | 6/2007 | Takada | F16M 11/2092 |
| | | | | 248/162.1 |
| 2017/0051866 | A1 | 2/2017 | Chen et al. | |
| 2018/0255920 | A1* | 9/2018 | Currie | A47B 21/04 |

OTHER PUBLICATIONS

European Patent Office, International Search Report and Written Opinion for PCT/EP2019/078508 filed Oct. 21, 2019, dated Jan. 30, 2020.

European Patent Office, International Preliminary Report on Patentability for PCT/EP2019/078508 filed Oct. 21, 2019, dated Dec. 16, 2020.

* cited by examiner

CONSOLE FOR AN OPERATING UNIT OF TECHNICAL INSTALLATIONS

The present invention relates to a console for an operating unit of technical installations, an operating console for technical installations and a use of a console.

Consoles for operating units of technical installations and operating consoles have long been known. Mobile consoles are characterised by the fact that they can be placed on a machine at a place of work and thus the operator can better observe and control the process within the machine. Mobile operating consoles have proven themselves in particular during the "start-up" of installations or the training and programming of robots. Height-adjustable operating consoles have also long been known, but these are usually permanently installed on a machine. In known mobile and height-adjustable operating consoles, the distance from the operating unit to the operator remains the same. However, the arm length also changes depending on the height of the operator, so a constant distance from the console to the operator is ergonomically unfavourable when operators have different heights. Operating stations are usually used with support arms, especially with bending machines, which significantly worsens the ergonomics since, on the one hand, the operating unit must be operated vertically, resulting in a constrained posture of the operator, while, on the other hand, the operating station cannot be used wherever in all the locations it is needed.

The aim of the invention is to provide a console for an operating unit with which the usability of technical installations can be designed to be ergonomically favourable.

This aim is achieved by a console for an operating unit of technical installations according to claim 1, an operating console for technical installations according to claim 14 and a use of a console according to claim 15.

One embodiment relates to a console for an operating unit for technical installations, in particular for workpiece processing machines, comprising a base element; a stand element held on the base element, wherein the stand element has a first segment and a second segment, the first segment being provided on the base element, and the second segment being angled on the first segment and having a free end; and a mounting support for the operating unit, wherein an adjusting device is provided for adjusting the mounting support on the second segment relative to the free end; wherein the second segment with the first segment forms an angle greater than 180°.

In particular, the stand element can have an operator side and/or the second segment can form an angle greater than 180° with the first segment on the operator side. Furthermore, the mounting support can be provided to be adjustable in particular on the operator side on the second segment relative to the free end.

According to one embodiment, the console has a base frame which has a base element and a stand element protruding therefrom in a longitudinal extension direction. An operating unit can be attached to the end of the stand element facing away from the base element, in particular by means of a mounting support for the operating unit which is provided on the end of the stand element facing away from the base element. Furthermore, an adjusting device for adjusting the operating unit is provided in a direction arranged at an angle to the longitudinal extension direction. As a result, the operating unit can be moved at the same time at a distance relative to the base element, for example in height from the ground, and at a distance from the operator.

Thus, the mounting support in the console for the operating unit can be moved obliquely upwards away from the operator or obliquely downwards closer to the operator. This takes both the height of the user and the operating situation into ergonomic consideration. The height of the operator is achieved by a guiding adjustability of the mounting support of the operating unit obliquely upwards or downwards relative to the vertical. Since larger persons generally also have longer arms and the mounting support is moved away from the operator when adjusted upwards, the distance between the operator and an operating unit provided on said mounting support is increased, and this design allows comfortable operation for people of large stature. Conversely, for smaller operators with shorter arms, the mounting support can be moved down towards the operator so that operation can be ergonomically designed for small statures. Thus, the height adjustment can be coupled to the distance of the operating unit from the operator.

In the case of the console, the angle can be designed in such a way that the second segment is angled in the region greater than 180° to the horizontal. Preferably, the second segment is angled 15° above the horizontal. Thus, a guiding adjustability of the mounting support of the operating unit obliquely upwards or downwards with respect to the vertical can be achieved. Preferably, the angle is within a range greater than 180° to 270°, more preferably 200° to 250°, more preferably 220° to 230°.

The mounting support can be designed such that an inclination angle of the operating unit is adjustable. The inclination angle can preferably be adjustable in a range between the angle predetermined by the second segment, when the operating unit is oriented parallel thereto, and the vertical. As a result, it is possible not only for the operating unit to be adjusted in height, but also inclined to avoid glare effects from exposure to light and to enable reading from a further distance.

The mounting support can be designed to be adjustable with at least one drive, in particular at least one gas pressure spring or at least one lockable gas pressure spring. This allows reliable and controllable adjustability of the mounting support of the operating unit.

A guide can be provided in the console on the second segment and a slider can be provided which is movable along the guide by means of a first drive for adjusting the mounting support relative to the free end. Thus, the height adjustment of the mounting support of the operating unit can be reliably achieved.

In the above embodiment, a joint having a rocker for receiving the operating unit and a counter-bearing can be provided on the slider, and the rocker can be movable with a second drive for adjusting the inclination angle of the operating unit. In this way, the inclination of the operating unit can be reliably adjusted.

The console can be provided with one or more operating elements for activating the operating unit, adjusting the mounting support and/or adjusting the inclination angle.

The console can be mobile and/or have at least one element selected from wheels and multi-directionally movable rollers on the base part. This makes it possible to move the console to different locations. If large-sized round rollers are used, it is possible to easily move the console in all directions, even on poor surfaces.

The console can be equipped with a fixing unit for locking the console.

Furthermore, the console can have a lever mechanism for restricting the mobility of the console in the vertical direction.

The lever mechanism can limit the movement of the wheels or rollers or lock the base part in the vertical direction by means of a brake unit.

Furthermore, the lever mechanism can comprise a first part for fixing the fixing unit and a second part for releasing the fixing unit, wherein the first part and the second part can be actuated from above.

The console can be equipped with a shelf or a universal mounting support. This is used to hold optional elements, such as a keyboard mount or scanner mount.

Another embodiment relates to an operating console for technical installations, in particular for workpiece processing machines, comprising a console according to one of the preceding embodiments and an operating unit. Thus, the aforementioned advantages of the console for the operating console for technical installations can be realised.

According to one embodiment, the operating console has a base frame, which has a base element and a stand element protruding therefrom in a longitudinal extension direction, comprising an operating unit arranged at the end of the stand element facing away from the base element and comprising an adjusting device for adjusting the operating unit in an angularly arranged direction to the longitudinal extension direction. As a result, the operating unit can be moved at the same time at a distance relative to the base element, for example in height from the ground, and at a distance from the operator.

Another embodiment indicates a use of a console according to one of the preceding embodiments for the operation of workpiece processing machines, in particular of bending machines.

Further features and advantages become apparent from the following description of embodiments, the figures and the dependent claims.

All non-mutually exclusive features of embodiments described here can be combined with one another. The same elements of the embodiments are given the same reference signs in the following description. Elements of one embodiment can be used in the other embodiments without further mention. Embodiments of the invention are now described in more detail using the following examples with reference to figures, without intending any limitation thereby. The following is shown in perspective in each case:

FIG. 1 as a first example, shows a console 1 according to an embodiment of the invention.

FIG. 2 as a second example, shows an operating console 2 according to an embodiment of the invention.

FIG. 3 shows the mounting support 22 of the examples.

FIG. 4 as a third example, shows a console 3 according to an embodiment with a base part 15.

Figure 7:
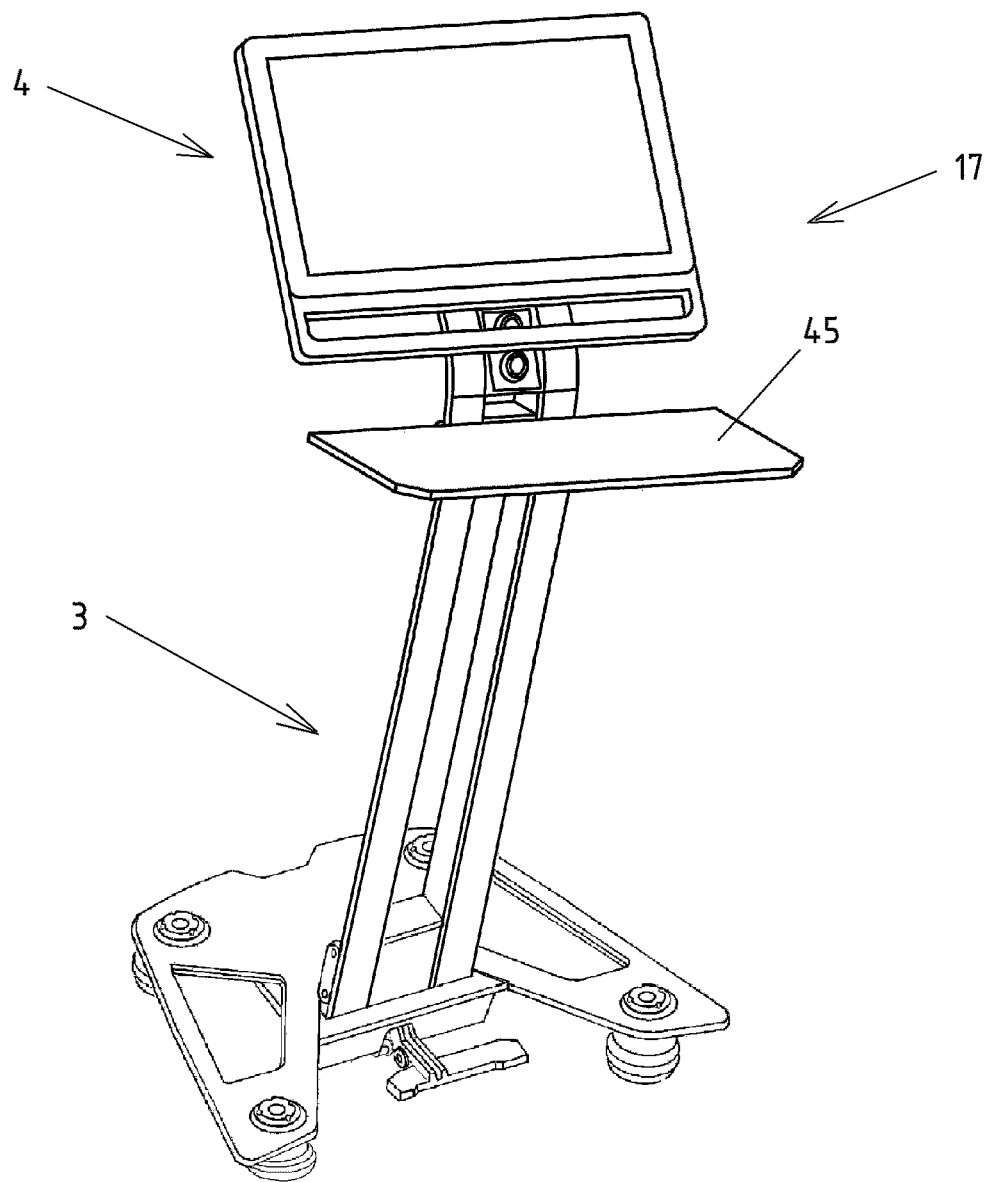

FIG. 7 as a fourth example, shows an operating console 4 with a shelf 45.

In the case of described value ranges, it is understood that the specification of a broad range with narrower alternative or preferred ranges also discloses ranges that can be formed by any combination of specified lower range limits and specified upper range limits.

Figure 1:
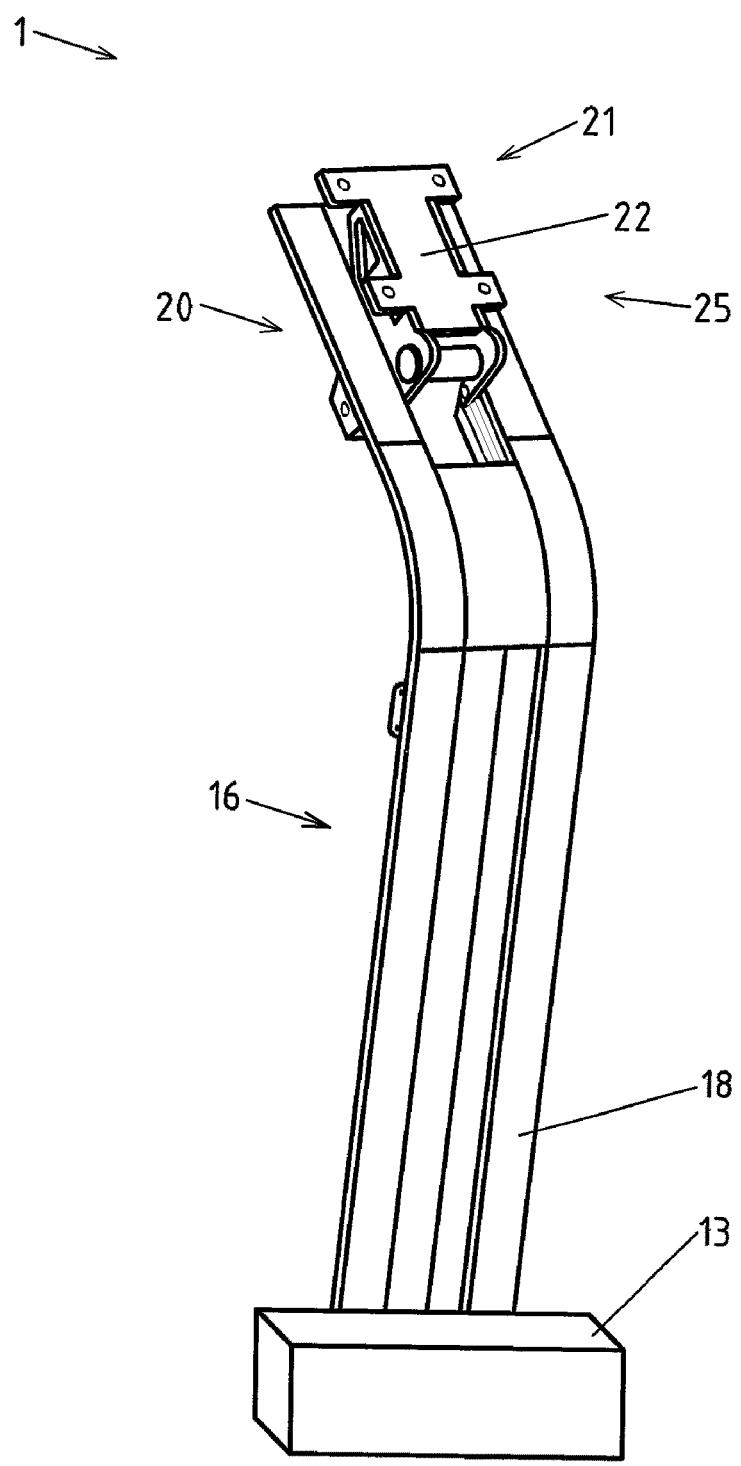

FIG. 1 shows, as a first example, a console 1 of a technical installation. The console 1 has a schematically illustrated base part 13, on which a stand element 16 is held. The stand element 16 has a first segment 18 which is secured to the base part 13 and is oriented to be vertical or slightly inclined from the vertical. The stand element 16 further has a second segment 20 which is attached to the first segment 18, has a free end 21 and is angled. The angle between the first segment 18 and the second segment 20 is approximately 220° in this example. On the second segment 20, a mounting support 22 for an operating unit (not shown) is provided. The mounting support 22 is adjustable relative to the free end 21 of the second segment 18 by means of an adjusting device 25. Thus, a guiding adjustability of the mounting support 22 of the operating unit obliquely upwards or downwards with respect to the vertical can be achieved during operation. Furthermore, in this way the height adjustment of the mounting support 22 for the operating unit is coupled to the distance of the operating unit from the operator.

In a modification, the console 1 has an operator side 17 which during operation is oriented towards the operator of the installation. The operator side is in particular defined by the fact that an operating surface of the operating unit to be attached or mounted on the console 1 will be or is oriented towards the operator. For the present modification of the first example, the operator side is on the front right in FIG. 1. In the present case, the first segment 18 attached to the base part 13 is oriented vertically or slightly inclined from the vertical with respect to the operator side. The second segment 20, which is attached to the first segment 18, is angled away from the operator side. The mounting support 22 for an operating unit is provided on the second segment on the operator side. Further, the operator-side angle between the first segment 18 and the second segment 20 in this modification is approximately 220°.

Figure 2:
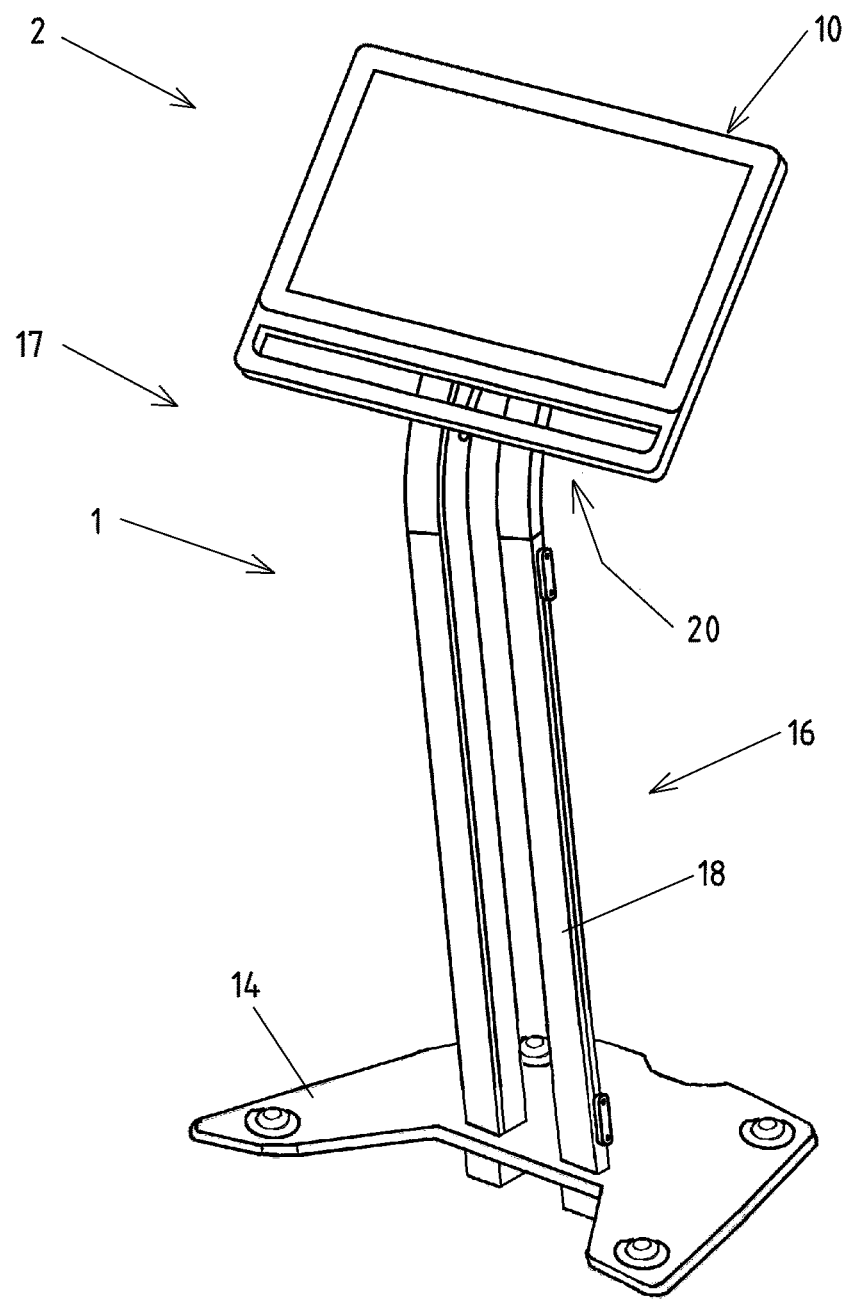

FIG. 2 illustrates an operating console 2 according to one embodiment as a second example. The operating console 2 is constructed from the console 1 with a base part 14, wherein an operating unit 10 is mounted on the second segment 20 of the console 1, i.e. on the mounting support 22. Since the user interface of the operating unit 10 is oriented toward the operator in the example shown in perspective view in FIG. 2, the operator side 17 is on the front left.

Figure 3:
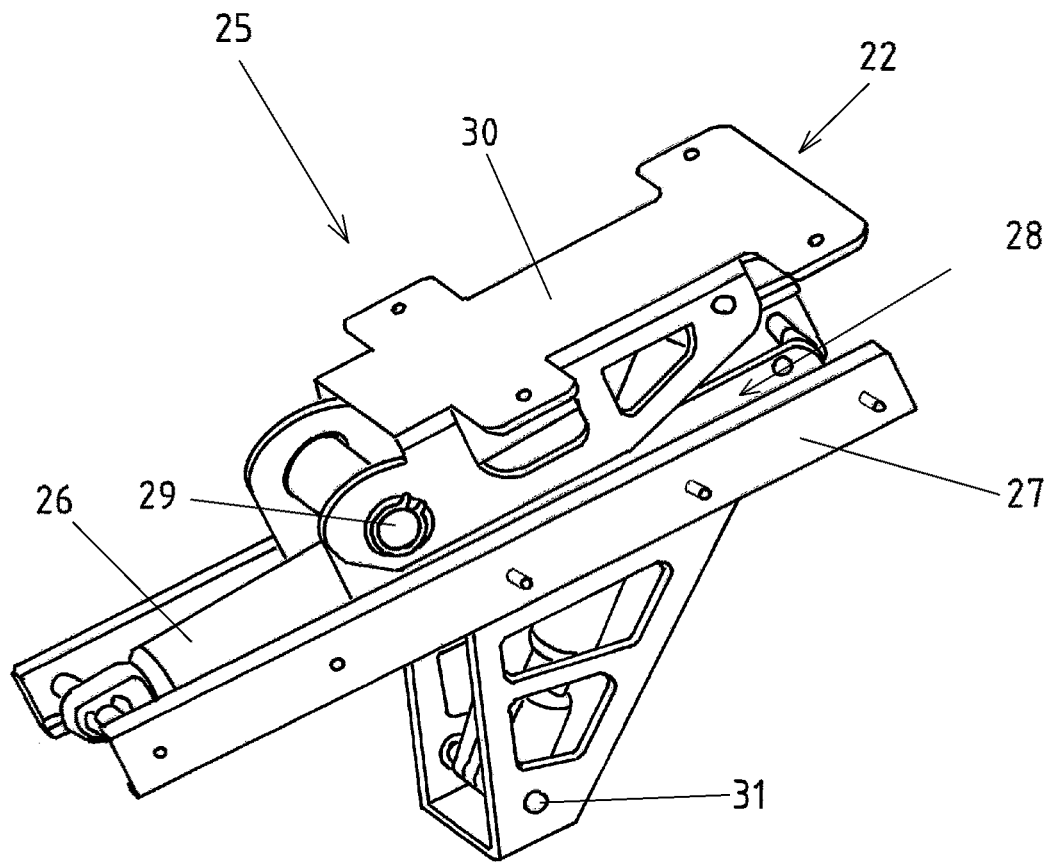

FIG. 3 shows the mounting support 22 and the adjusting device 25 of the above examples. The adjusting device 25 includes a guide provided on the second segment and a slider 28 which is movable along the guide by means of a first drive for adjusting the mounting support 22 relative to the free end. On the slider, a joint 29 comprising a rocker 30 for receiving the operating unit and a counter-bearing 31 are provided, and the rocker 30 is movable with a second drive for adjusting the inclination angle of the operating unit.

The adjusting device 25 has a lockable gas pressure spring 26 as the first drive for adjusting the mounting support 22 relative to the free end 21 of the console 1. The guide 27 is provided on the second segment 20 in the console 1. Furthermore, a slider 28 that is movable along the guide 27 by means of the gas pressure spring 26 is provided for adjusting the mounting support relative to the free end 21. Thus, in the case of the operating console 2, the height adjustment of the mounting support 22 on the console 1 and thus of the operating unit 10 is reliably achieved in operation.

In a modification of the above examples, the mounting support 22 is further configured such that an inclination angle of the operating unit is adjustable. As a result, it is possible not only for the operating unit to be adjusted in height, but also inclined to avoid glare effects from exposure to light and to enable reading from a further distance. For this purpose, a joint 29 comprising a rocker 30 for receiving the operating unit 10, in particular on the operator side, and a counter-bearing 31 are provided on the slider 28. The rocker 30 is movable with a second lockable gas pressure spring as the second drive, which is arranged, for example, on the counter-bearing 31 for adjusting the inclination angle of the operating unit. In this way, the inclination of the operating unit is reliably adjusted during operation.

Figure 4:
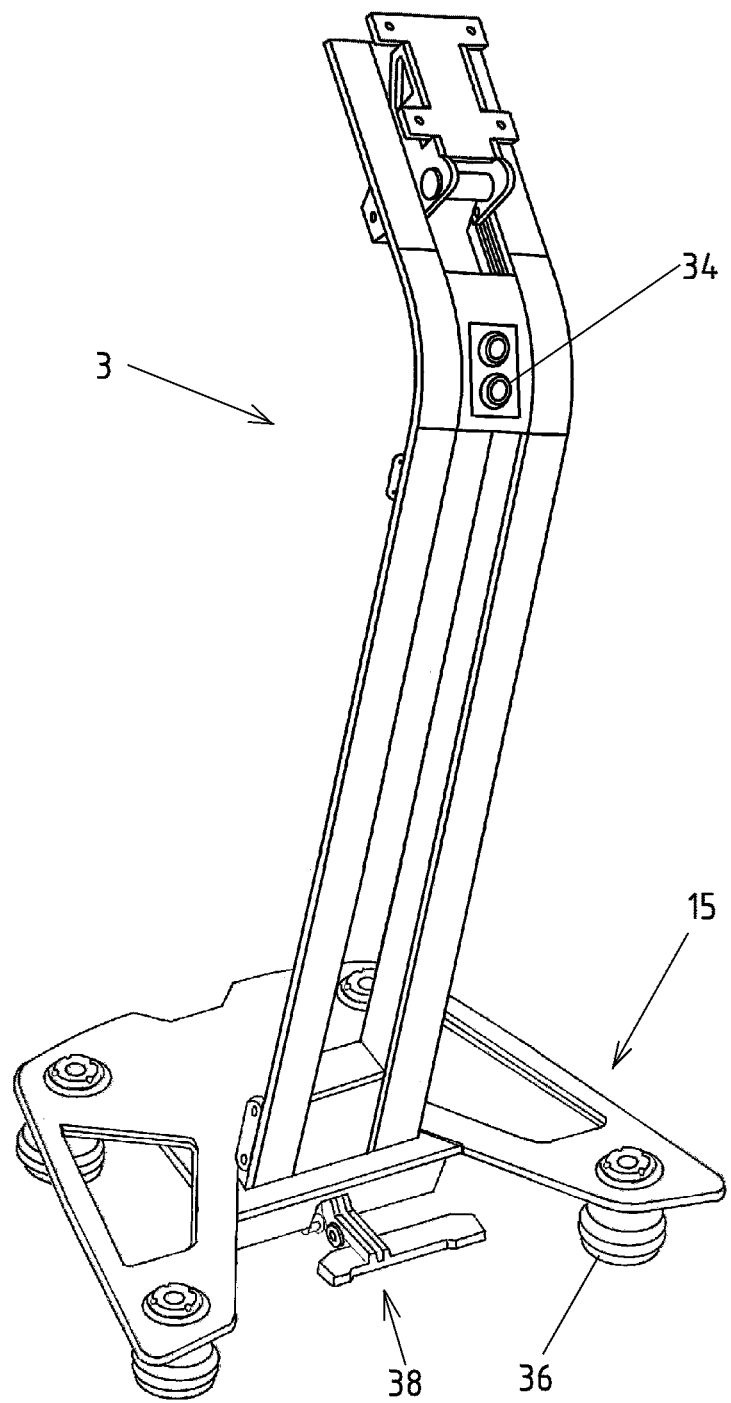

As illustrated in FIG. 4, a console 3 of a further modification of the first example is provided with one or more operating elements 34 for activating the operating unit, adjusting the mounting support and/or adjusting the inclination angle.

FIG. 4 also shows that the console 3 is mobile because of a modified base part 15. In the present case, all-round movable rollers 36 are attached to the underside of the base part 15. During operation, this makes it possible to move the console 3 to different locations.

Figure 5:
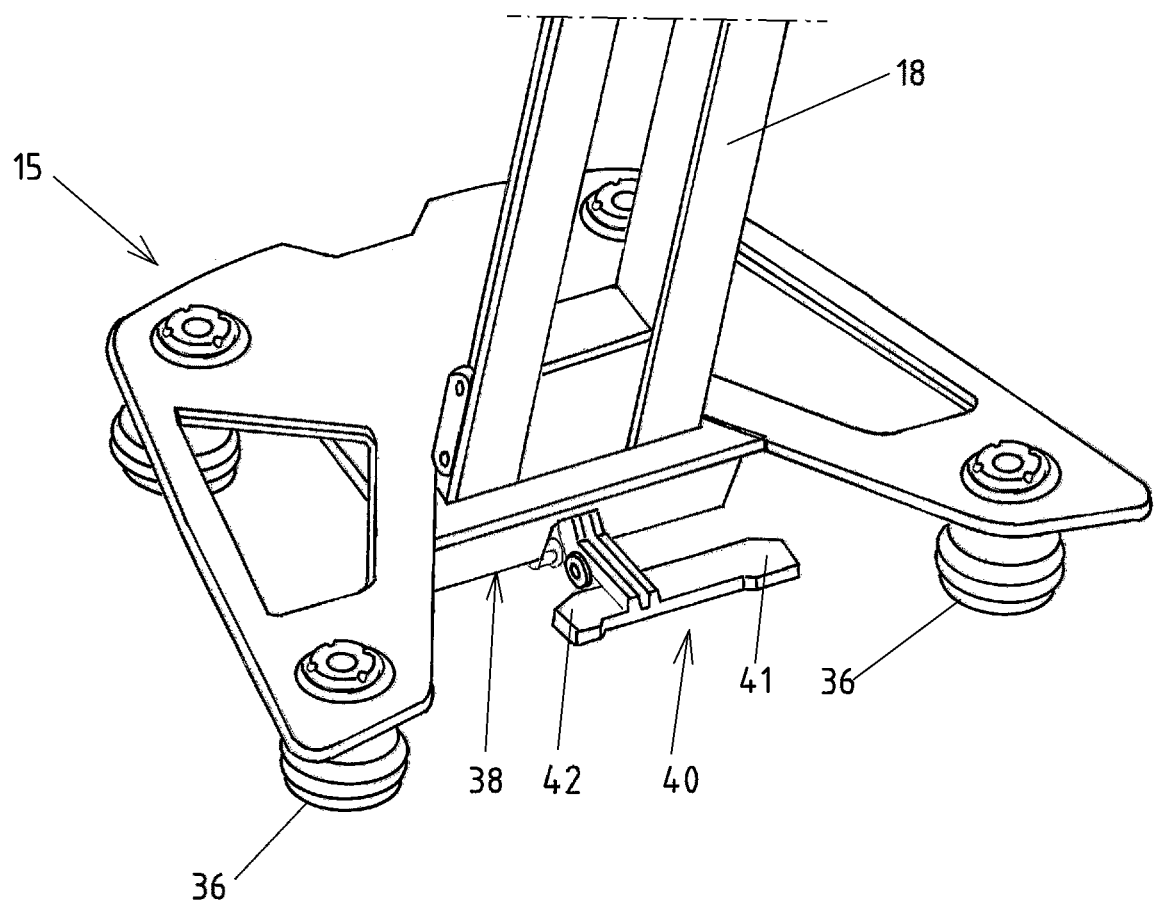
FIG. 5 shows the base part 15 of the console 3 in perspective view from above.
Figure 6:
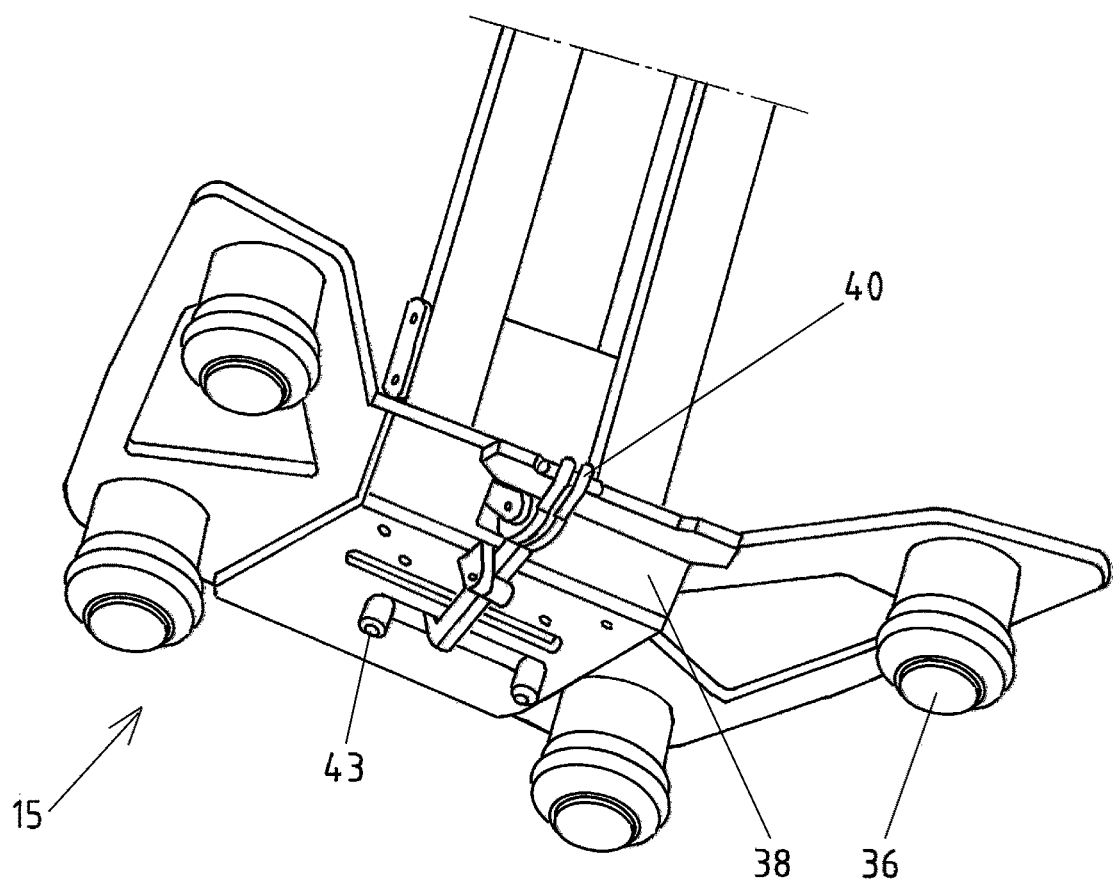
FIG. 6 shows the base part 15 of the console 3 in perspective view from below.

The console 3 is, as shown in FIG. 5, further provided with a fixing unit 38 for locking the console 3. For this purpose, in the present case, the console 3 has a lever mechanism 40 for restricting the mobility of the console in the vertical direction. During operation, the lever mechanism 40 locks the base part 15 in the vertical direction by means of a brake unit 43. The brake unit can be seen in FIG. 6 in a perspective view of the base part 15 from below. In addition, the lever mechanism 40 has a first part 41 for fixing the fixing unit and a second part 42 for releasing the fixing unit 38, wherein the first and the second part can be actuated from above by the operator.

FIG. 7 illustrates an operating console 4 as a further modification of the operating console 2, in which a shelf 45 is provided on the console 3. This is used to hold optional elements, such as a keyboard mount or scanner mount.

Finally, it should be noted that the description of the invention and the exemplary embodiments are not to be understood as limiting in terms of a particular physical implementation of the invention. All of the features explained and shown in connection with individual embodiments of the invention can be provided in different combinations in the subject matter according to the invention to simultaneously realise their advantageous effects.

The scope of the present invention is given by the claims and is not limited by the features explained in the description or shown in the figures.

LIST OF REFERENCE SIGNS

1 Console
2 Operating console
3 Console
4 Operating console
10 Operating unit
13 Base element
14 Base element
15 Base element
16 Stand element
17 Operator side
18 First segment
20 Second segment
21 Free end
22 Mounting support
25 Adjusting device
26 Drive
27 Guide
28 Slider
29 Joint
30 Rocker
31 Counter-bearing
34 Operating element
36 Rollers
38 Fixing unit
40 Lever mechanism
41 First part
42 Second part
43 Brake unit
45 Shelf

The invention claimed is:

1. A console for an operating unit for technical installations, in particular for workpiece processing machines, comprising
a base element;
a stand element held on the base element, wherein the stand element comprises a first segment and a second segment, the first segment being provided on the base element, and the second segment being angled on the first segment and having a free end; and
a mounting support for the operating unit, wherein an adjusting device is provided for adjusting the mounting support on the second segment relative to the free end;
wherein the second segment with the first segment forms an angle greater than 180°;
wherein a guide is provided on the second segment and a slider which is movable along the guide is provided for adjusting the mounting support relative to the free end by means of a first drive;
wherein a joint having a rocker for receiving the operating unit and a counter-bearing are provided on the slider, and the rocker is movable with a second drive for adjusting an inclination angle of the operating unit.

2. The console according to claim 1, wherein the angle is formed such that the second segment is angled greater than 180° to the horizontal.

3. The console according to claim 1, wherein the mounting support is adjustable with the first drive, wherein the first drive is, at least one gas pressure spring or at least one lockable gas pressure spring.

4. The console according to claim 1, comprising
one or more operating elements for activating the operating unit, adjusting the mounting support and/or adjusting the inclination angle.

5. The console according to claim 1, wherein the console is mobile and/or comprises on the base element at least one element selected from wheels and multi-directionally movable rollers.

6. The console according to claim 5, having a lever mechanism for limiting the mobility of the console in the vertical direction.

7. The console according to claim 6, wherein the lever mechanism comprises a first part for fixing a fixing unit and a second part for releasing the fixing unit, wherein the first part and the second part are designed to be actuated from above.

8. The console according to claim 1, having a shelf.

9. An operating console for technical installations, in particular of workpiece processing machines, comprising a console according to claim 1 and an operating unit.

10. A use of a console according to claim 1, the console being used with the operation of workpiece processing machines, in particular of bending machines.

* * * * *